United States Patent
Atzmon (10) Patent No.: US 8,386,630 B1
(45) Date of Patent: Feb. 26, 2013

(54) VIDEO-AWARE P2P STREAMING AND DOWNLOAD WITH SUPPORT FOR REAL-TIME CONTENT ALTERATION

(75) Inventor: Asaf Atzmon, Cambridge, MA (US)

(73) Assignee: ARRIS Solutions, Inc., Suwanee, GA (US)

( * ) Notice: Subject to any disclaimer, the term of this patent is extended or adjusted under 35 U.S.C. 154(b) by 207 days.

(21) Appl. No.: 12/205,878

(22) Filed: Sep. 7, 2008

Related U.S. Application Data (60) Provisional application No. 60/970,961, filed on Sep. 9, 2007.

(51) Int. Cl.
*G06F 15/16* (2006.01)
*H04B 7/00* (2006.01)

(52) U.S. Cl. ..................... 709/231; 455/41.2

(58) Field of Classification Search .................. 709/217, 709/231, 246; 370/392; 455/41.5
See application file for complete search history.

(56) References Cited

U.S. PATENT DOCUMENTS

| | | | |
|---|---|---|---|
| 5,551,020 A * | 8/1996 | Flax et al. .............................. | 1/1 |
| 5,559,562 A * | 9/1996 | Ferster ........................... | 348/584 |
| 5,566,174 A * | 10/1996 | Sato et al. ........................ | 370/468 |
| 5,568,180 A * | 10/1996 | Okamoto ........................ | 725/92 |
| 5,610,841 A * | 3/1997 | Tanaka et al. .................. | 725/115 |
| 5,629,732 A * | 5/1997 | Moskowitz et al. ........... | 725/102 |
| 5,659,539 A * | 8/1997 | Porter et al. ................... | 709/231 |
| 5,790,176 A * | 8/1998 | Craig ............................. | 725/115 |
| 5,801,781 A * | 9/1998 | Hiroshima et al. ............ | 348/441 |
| 5,818,512 A * | 10/1998 | Fuller ............................. | 725/82 |
| 5,826,024 A * | 10/1998 | Higashimura et al. ........ | 709/214 |
| 6,112,181 A | 8/2000 | Shear et al. | |
| 6,112,304 A | 8/2000 | Clawson | |
| 6,578,070 B1 * | 6/2003 | Weaver et al. ................. | 709/206 |
| 6,801,544 B1 * | 10/2004 | Rijckaert et al. ............... | 370/473 |
| 7,006,456 B2 * | 2/2006 | Rabipour et al. ............. | 370/260 |
| 7,089,226 B1 | 8/2006 | Dumais et al. | |
| 7,093,001 B2 | 8/2006 | Yang et al. | |
| 7,143,066 B2 | 11/2006 | Shear et al. | |
| 7,143,087 B2 | 11/2006 | Fairweather | |
| 7,174,385 B2 * | 2/2007 | Li ................................... | 709/231 |
| 7,194,543 B2 | 3/2007 | Robertson et al. | |
| 7,243,130 B2 | 7/2007 | Horvitz et al. | |
| 7,280,540 B2 * | 10/2007 | Halme et al. .................. | 370/392 |
| 7,370,120 B2 * | 5/2008 | Kirsch et al. .................. | 709/246 |
| 7,417,996 B2 * | 8/2008 | Hong et al. .................... | 370/401 |
| 7,512,278 B2 * | 3/2009 | Magee et al. .................. | 382/232 |
| 7,539,767 B2 * | 5/2009 | Li .................................. | 709/231 |
| 7,558,797 B2 * | 7/2009 | Li ................................... | 1/1 |
| 7,613,770 B2 * | 11/2009 | Li .................................. | 709/203 |
| 7,664,109 B2 * | 2/2010 | Li .................................. | 370/392 |
| 7,752,327 B2 * | 7/2010 | Li .................................. | 709/231 |
| 2001/0036356 A1 * | 11/2001 | Weaver et al. .................. | 386/52 |
| 2002/0087716 A1 | 7/2002 | Mustafa | |
| 2002/0126675 A1 * | 9/2002 | Yoshimura et al. ...... | 370/395.21 |
| 2002/0146676 A1 | 10/2002 | Reynolds | |
| 2003/0026256 A1 * | 2/2003 | Jinzaki ........................... | 370/392 |
| 2003/0145093 A1 | 7/2003 | Oren et al. | |
| 2003/0167425 A1 * | 9/2003 | Bader et al. .................... | 714/100 |
| 2005/0058207 A1 * | 3/2005 | Magee et al. ............ | 375/240.26 |
| 2005/0068892 A1 * | 3/2005 | Roberts et al. ................ | 370/233 |
| 2005/0125405 A1 * | 6/2005 | Watson et al. ................... | 707/7 |

(Continued)

*Primary Examiner* — Brian P Whipple
*Assistant Examiner* — Michael A Chambers
(74) *Attorney, Agent, or Firm* — Troy A. Van Aacken; Robert J. Starr (57) ABSTRACT

A method for generating chunks for peer to peer distribution, the method includes: converting a media stream to chunks of variable size in response to media characteristics of the media stream; generating a hash value for each chunk; and transmitting to a peer to peer manager hash values and media characteristic information associated with the chunks.

34 Claims, 6 Drawing Sheets

U.S. PATENT DOCUMENTS

| | | | |
|---|---|---|---|
| 2005/0243787 A1* | 11/2005 | Hong et al. | 370/338 |
| 2005/0243922 A1* | 11/2005 | Magee et al. | 375/240.12 |
| 2005/0267948 A1* | 12/2005 | McKinley et al. | 709/217 |
| 2005/0276570 A1* | 12/2005 | Reed et al. | 386/46 |
| 2005/0281259 A1* | 12/2005 | Mitchell | 370/389 |
| 2006/0047948 A1* | 3/2006 | Shen et al. | 713/153 |
| 2006/0050697 A1* | 3/2006 | Li et al. | 370/389 |
| 2006/0053209 A1* | 3/2006 | Li | 709/217 |
| 2006/0069800 A1* | 3/2006 | Li | 709/232 |
| 2006/0080454 A1* | 4/2006 | Li | 709/231 |
| 2006/0109870 A1* | 5/2006 | Miyaji et al. | 370/537 |
| 2006/0140134 A1 | 6/2006 | O'Brien et al. | |
| 2006/0159109 A1* | 7/2006 | Lamkin et al. | 370/401 |
| 2006/0242155 A1* | 10/2006 | Moore et al. | 707/10 |
| 2007/0005694 A1 | 1/2007 | Popkin et al. | |
| 2007/0130253 A1* | 6/2007 | Newson et al. | 709/203 |
| 2007/0130360 A1* | 6/2007 | Li | 709/231 |
| 2007/0130361 A1* | 6/2007 | Li | 709/231 |
| 2008/0005113 A1* | 1/2008 | Li | 707/9 |
| 2008/0005114 A1* | 1/2008 | Li | 707/9 |
| 2008/0005120 A1* | 1/2008 | Li | 707/10 |
| 2008/0005195 A1* | 1/2008 | Li | 707/203 |
| 2008/0034228 A1 | 2/2008 | Shear et al. | |
| 2008/0055469 A1* | 3/2008 | Miyasaka et al. | 348/521 |
| 2008/0098123 A1* | 4/2008 | Huang et al. | 709/231 |
| 2008/0103805 A1 | 5/2008 | Shear et al. | |
| 2008/0109240 A1 | 5/2008 | Shear et al. | |
| 2008/0120330 A1 | 5/2008 | Reed et al. | |
| 2008/0133767 A1* | 6/2008 | Birrer et al. | 709/231 |
| 2008/0155120 A1* | 6/2008 | Argawal et al. | 709/242 |
| 2009/0176452 A1* | 7/2009 | Hillyard | 455/41.2 |

* cited by examiner

Converting the media stream to chunks in response to media characteristics and transport layer characteristics of the media stream. 211

Converting the media stream to chunks in response to media characteristics and transport layer characteristics such as but not limited to media frame boundaries, transport layer structures, program identifier values, group of picture boundaries, clock reference information, transport layer tables, scalable video coding metadata 212

Converting the media stream to chunks while maintaining media and transport layer structures. 213

Converting the media stream to chunks while flagging chunks that comprises independently decodable frames. 214

Converting the media stream to an audio chunk stream, a video chunk stream and metadata chunk stream 215

Converting a single media stream element to multiple chunks that differ from each other by a size parameter 216

Generating association information that associate the multiple chunks to each other. The association information can indicate which media stream element was converted to multiple chunks. Association information can be included in the chunk metadata. 217

```
┌─────────────────────────────────────────────────────────────────┐
│ Contacting a peer to peer server to obtain information such as  │
│ tracker access information and metadata that describes the      │
│ available versions of media streams, whereas different versions │
│ can be characterized by different bit rates.                    │
│ 405                                                             │
└─────────────────────────────────────────────────────────────────┘
                                 │
┌─────────────────────────────────────────────────────────────────┐
│ Downloading chunk metadata from tracker 20, the chunk metadata  │
│ can relate to a media stream that is going to be received (or is│
│ already being received) by the peer, the chunk metadata can     │
│ include independently decodable frame flags 410                 │
└─────────────────────────────────────────────────────────────────┘
                                 │
┌─────────────────────────────────────────────────────────────────┐
│ Requesting from the tracker to receive one or more peer data    │
│ structure associated with a media stream of interest or with at │
│ least one chunk stream associated with the media stream 412     │
└─────────────────────────────────────────────────────────────────┘
                                 │
┌─────────────────────────────────────────────────────────────────┐
│         Receiving one or more peer data structures 416          │
└─────────────────────────────────────────────────────────────────┘
                                 │
┌─────────────────────────────────────────────────────────────────┐
│ Contacting one or more peers listed in one or more peer data    │
│ structure in order to obtain peer information indicative of     │
│ which chunks that peer stores and to obtain chunk metadata      │
│ relating to those chunks 418                                    │
└─────────────────────────────────────────────────────────────────┘
                                 │
┌─────────────────────────────────────────────────────────────────┐
│ Requesting from the one or more peers one or more chunks,       │
│ wherein the request can include indicating one or more          │
│ characters (out of a media characteristic and a transport layer │
│ characteristic) of the requested chunk                          │
│ 420                                                             │
└─────────────────────────────────────────────────────────────────┘
                                 │
┌─────────────────────────────────────────────────────────────────┐
│ Receiving the requested one or more chunks and placing in a     │
│ display buffer                                                  │
│ 422                                                             │
└─────────────────────────────────────────────────────────────────┘
                                 │
┌─────────────────────────────────────────────────────────────────┐
│      Updating tracker that the one or more chunks were received 424 │
└─────────────────────────────────────────────────────────────────┘
```

VIDEO-AWARE P2P STREAMING AND DOWNLOAD WITH SUPPORT FOR REAL-TIME CONTENT ALTERATION

RELATED APPLICATIONS

This application claims priority from U.S. provisional patent Ser. No. 60/970,961 filing date Sep. 9, 2007.

BACKGROUND OF THE INVENTION

Current peer to peer (hereinafter—P2P) download and streaming systems are unaware of the media and transport layer characteristics of the payload they are carrying. Furthermore, they bear several restrictions in their design that disallows content alteration to take place at intermediate nodes.

P2P is gradually becoming an efficient alternative to deliver content and video to end-users. Most early P2P implementations were able to support file download only. In these systems, the asset is sliced at the point of ingest into many file chunks of a pre-defined size, each chunk is hashed to produce its hash value, and a metadata file is created (including a dictionary of all chunk hash values). The metadata file is typically distributed to a centralized server (typically called a tracker) and to web servers.

Users discover about the existence of a P2P asset by external means such as websites and search engines, and are directed to the aforementioned metadata file. With the information at the metadata file, they contact the tracker and effectively become part of that asset torrent or swarm. The tracker of the asset is constantly collecting report data about each of the users (peers) of the torrent, including who is currently connected and what parts of the asset they are in possession of. The tracker is also responsible for providing any requesting peer with a list (a subset) of other peers in that torrent.

Peers engage in chunks transfer governed by some transfer algorithms; chunks are typically transferred using protocols such as TCP/IP. Since there are no real-time constraints requiring chunks to arrive at any given specific order, the algorithms usually try to create a uniform spread of all chunks between the swarm users, thus providing a better distribution rate for the file.

Recently, some new methods were introduced into existing system, in a way which eliminates the need for a centralized tracker, and instead distributes the tracking function between the peers themselves, using techniques such as Distributed Hash Tables (DHT).

A new breed of P2P system is now becoming popular. These systems allow a linear TV viewing experience; i.e. users are tuning into channels and are provided with a constant stream of video. The actual implementation varies from one vendor to another. Some systems such as PPLive, use protocols like BitTorrent which were originally designed for file download, with some extensions that allow it to work within the time constraints of streaming. Other popular systems such as Joost and Babelgum use proprietary methods whose details are non-public. These systems, however, are considered to be using some hybrid of server infrastructure and peers intelligence to work.

P2P quality-of-experience (QoE) is far from optimal today since traffic is usually transferred as a best-effort Quality of Service (QoS) class and packets are typically dropped or delayed in the face of network congested links, thus seriously severing the smooth viewing experience expected from a video service. Current implementations usually rely on more bandwidth and TCP/IP retransmission algorithm to eventually deliver the traffic to the end-user; while this is a valid approach for download, it has little value for streaming.

What is needed is a system and protocols which are more dynamic in nature, in a way that allows it to apply various techniques of real-time content alteration to overcome network congestion as they appear. Some of these techniques change content by reducing its size and bitrate through rate-shaping algorithms, while others like Forward Error Correction (FEC) introduce overhead to the packet, to allow it to be reconstructed at the receiving end. These technologies are known and in use in traditional broadcast and IPTV systems, however they have never been designed in a P2P environment.

There are several elements in the current system design that currently disallow these operations, as such:

Video awareness in the protocol and architecture level—current P2P streaming pay very little attention to the nature of the payload they distribute and as a result they provide poor utilization in terms of network resources and user experience. The video which is carried within the P2P packets has a known structure and some unique characteristics. Few such examples are I, B, P frames hierarchy, GOP size and structure, video clock information, metadata tables and layers in Scalable Video Coding profile. This unawareness of video, restricts systems in applying real-time video processing to P2P traffic.

No video semantics—another limit of current P2P streaming is that it makes the assumption that equality between two frames of video on separate clients (e.g. 2 users watching the same scene in the same channel) entails two identical bit structures. This is however, known not to be the case. For example, a frame might be quality-degraded or trans-coded while it still semantically bears the same meaning.

As a direct result of the previous statement, P2P hashing mechanism is inadequate for the delivery of video, since current hash implementations, take the assumption that 2 semantically equal frames will have the same bit structure and hence the same hash value. This entails, that any alteration to a transfer unit in the P2P schema, will cause damage to its hash consistency resulting in its purge at the receiving endpoint.

Lastly, current systems apply a single dimensional indexing system for accessing transfer units (chunks). For example, a client can ask for only one representation or version of a transfer unit. In order to allow, multiple versions (such as different bitrates) of the same unit to co-exist there is a need for a better multi-dimensional indexing system.

SUMMARY

A method for generating chunks for peer to peer distribution, the method includes: converting a media stream to chunks of variable size in response to media characteristics of the media stream; generating a hash value for each chunk; and transmitting to a peer to peer manager hash values and media characteristic information associated with the chunks.

The method can include converting the media stream to chunks in response to media characteristics and transport layer characteristics of the media stream.

The method can include converting the media stream to chunks in response to media characteristics and transport layer characteristics selected from a group consisting of media frame boundaries, transport layer structures, program identifier values, group of picture boundaries, clock reference information, transport layer tables, scalable video coding metadata.

The method can include converting the media stream to chunks while maintaining media and transport layer structures.

The method can include converting the media stream to chunks while flagging chunks that includes independently decodable frames.

The method can include receiving a request from a peer to obtain chunks of the media stream and providing the chunks to the peer.

The method can include converting the media stream to an audio chunk stream, a video chunk stream and metadata chunk stream.

The method can include converting a single media stream element to multiple chunks that differ from each other by a size parameter.

The method can include generating association information that associate the multiple chunks to each other.

The method can include determining a capability of a peer to seamlessly switch from a first bit rate chunk to a second bit rate chunk; wherein the first bit rate differs from the second bit rate.

A method for managing peer to peer distribution of chunks, the method includes: receiving, by a peer to peer manager, hash values and media characteristic information associated with chunks that represent a media stream; receiving capacity information indicative of capacity constraints associated with a provision of chunks to peers; receiving, from a peer, a request to obtain a peer data structure indicative of peers that are capable of providing chunks associated with a media stream; generating the peer data structure in response to an identity of the media stream, the media characteristic information and capacity information; and transmitting to the peer the peer data structure.

The method can include instructing an intermediate node to compress a chunk to provide a compresses chunk and generating the peer data structure so as to identify the intermediate node as a possible source of the compressed chunk.

The method can include selecting a chunk out of multiple chunks that represent the same media stream element but differ from each other by a size parameter; wherein the generating of the peer to peer data structure is responsive to the selected chunk.

The method can include generating the peer data structure in response to a capability of the peer to seamlessly receive and process consecutive chunks of different bit rates.

The method can include generating a peer data structure per video chunk stream, per audio chunk stream and per stream processing information chunk stream.

A media processor that includes: a media stream converter configured to convert a media stream to chunks of variable size in response to media characteristics of the media stream; a metadata generator, configured to generate a hash value for each chunk; and a transmitter for transmitting to a peer to peer manager hash values and media characteristic information associated with the chunks.

The media processor can be configured to convert the media stream to chunks in response to media characteristics and transport layer characteristics of the media stream.

The media processor can be configured to convert the media stream to chunks in response to media characteristics and transport layer characteristics selected from a group consisting of media frame boundaries, transport layer structures, program identifier values, group of picture boundaries, clock reference information, transport layer tables, scalable video coding metadata.

The media processor can be configured to convert the media stream to chunks while maintaining media and transport layer structures.

The media processor can be configured to convert the media stream to chunks while flagging chunks that includes independently decodable frames.

The media processor can be configured to receive a request from a peer to obtain chunks of the media stream and providing the chunks to the peer.

The media processor can be configured to convert the media stream to an audio chunk stream, a video chunk stream and metadata chunk stream.

The media processor can be configured to convert a single media stream element to multiple chunks that differ from each other by a size parameter.

The media processor can be configured to generate association information that associate the multiple chunks to each other.

The media processor can be configured to determine a capability of a peer to seamlessly switch from a first bit rate chunk to a second bit rate chunk; wherein the first bit rate differs from the second bit rate.

A peer to peer manager that includes: a receiver that is configured to receive: hash values and media characteristic information associated with chunks that represent a media stream, capacity information indicative of capacity constraints associated with a provision of chunks to peers; a request to obtain a peer data structure indicative of peers that are capable of providing chunks associated with a media stream; a metadata generator configured to generate the peer data structure in response to an identity of the media stream, the media characteristic information and capacity information; and a transmitter, configured to transmit to the peer the peer data structure.

The peer to peer manager can include a controller that is configured to instruct an intermediate node to compress a chunk to provide a compresses chunk and wherein the metadata generator is configured to generate the peer data structure so as to identify the intermediate node as a possible source of the compressed chunk.

The peer to peer manager can include a controller that is configured to select a chunk out of multiple chunks that represent the same media stream element but differ from each other by a size parameter; wherein the metadata generator is configured to generate a peer to peer data structure that is responsive to the selected chunk.

The peer to peer manager can be configured to generate the peer data structure in response to a capability of the peer to seamlessly receive and process consecutive chunks of different bit rates.

The peer to peer manager can include a metadata generator that is configured to generate a peer data structure per video chunk stream, per audio chunk stream and per stream processing information chunk stream.

A computer program product that includes a computer readable medium that stores instructions for: converting a media stream to chunks of variable size in response to media characteristics of the media stream; generating a hash value for each chunk; and transmitting to a peer to peer manager hash values and media characteristic information associated with the chunks.

The computer program product includes a computer readable medium that can store instructions for converting the media stream to chunks in response to media characteristics and transport layer characteristics of the media stream.

The computer program product includes a computer readable medium that can store instructions for converting the media stream to chunks in response to media characteristics and transport layer characteristics selected from a group consisting of media frame boundaries, transport layer structures, program identifier values, group of picture boundaries, clock reference information, transport layer tables, scalable video coding metadata.

The computer program product includes a computer readable medium that can store instructions for converting the media stream to chunks while maintaining media and transport layer structures.

The computer program product includes a computer readable medium that can store instructions for converting the media stream to chunks while flagging chunks that includes independently decodable frames.

The computer program product includes a computer readable medium that can store instructions for receiving a request from a peer to obtain chunks of the media stream and providing the chunks to the peer.

The computer program product includes a computer readable medium that can store instructions for converting the media stream to an audio chunk stream, a video chunk stream and metadata chunk stream.

The computer program product includes a computer readable medium that can store instructions for converting a single media stream element to multiple chunks that differ from each other by a size parameter.

The computer program product includes a computer readable medium that can store instructions for generating association information that associate the multiple chunks to each other.

The computer program product includes a computer readable medium that can store instructions for determining a capability of a peer to seamlessly switch from a first bit rate chunk to a second bit rate chunk; wherein the first bit rate differs from the second bit rate.

A computer program product that includes a computer readable medium that stores instructions for: receiving, by a peer to peer manager, hash values and media characteristic information associated with chunks that represent a media stream; receiving capacity information indicative of capacity constraints associated with a provision of chunks to peers; receiving, from a peer, a request to obtain a peer data structure indicative of peers that are capable of providing chunks associated with a media stream; generating the peer data structure in response to an identity of the media stream, the media characteristic information and capacity information; and transmitting to the peer the peer data structure.

The computer program product includes a computer readable medium that can store instructions for converting the media stream to chunks in response to media characteristics and transport layer characteristics selected from a group consisting of media frame boundaries, transport layer structures, program identifier values, group of picture boundaries, clock reference information, transport layer tables, scalable video coding metadata.

The computer program product includes a computer readable medium that can store instructions for converting the media stream to chunks while maintaining media and transport layer structures.

The computer program product includes a computer readable medium that can store instructions for converting the media stream to chunks while flagging chunks that includes independently decodable frames.

The computer program product includes a computer readable medium that can store instructions for receiving a request from a peer to obtain chunks of the media stream and providing the chunks to the peer.

The computer program product includes a computer readable medium that can store instructions for converting the media stream to an audio chunk stream, a video chunk stream and metadata chunk stream.

The computer program product includes a computer readable medium that can store instructions for converting a single media stream element to multiple chunks that differ from each other by a size parameter.

The computer program product includes a computer readable medium that can store instructions for generating association information that associate the multiple chunks to each other.

The computer program product includes a computer readable medium that can store instructions for determining a capability of a peer to seamlessly switch from a first bit rate chunk to a second bit rate chunk; wherein the first bit rate differs from the second bit rate.

BRIEF DESCRIPTION OF THE DRAWINGS

Further details, aspects, and embodiments of the invention will be described, by way of example only, with reference to the drawings.

DETAILED DESCRIPTION OF THE DRAWINGS

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

For simplicity of explanation it is assumed that a media stream is MPEG-2 compliant and that the transport layer is an MPEG-2 transport layer. It is noted that the methods and systems described below are not limited to these standard and transport layer.

It has been shown that media aware chunking and, additionally or alternatively, transport layer aware chunking can contribute to peer to peer distribution of media streams.

Metadata such as capacity limitations information, forward error correction information, peer data structure, association information, media characteristic information, transport layer characteristic information, and splicing information can be generated and distributed among various entity to facilitate the mentioned below methods. The metadata can be arranged in various formats and data structures.

For example, metadata can include a metadata file that includes the index of chunk hash-values (not specific to any peer) and can be obtained independently from other metadata such as a peer data structure (also referred to as per-peer chunks map) that details what chunks this peer holds.

The methods and systems can support P2P real-time content processing and alteration. This in turn, allows an appliance of video processing technologies such as forward error correction (FEC), splicing and rate-shaping to P2P streaming.

Elements of the P2P architecture such as chunk size can be responsive to media characteristics and, additionally or alternatively to transport layer characteristics. Information related to these characteristics can be sent to peer to peer managers such as trackers as well as to peers and intermediate nodes. It is noted that this information can also be provided in distributed architectures that do not include a tracker but share metadata such as Distributed Hash Table (DHT) between peers. For example, a peer can request a chunk that has a certain media characteristic (for example, request to obtain chunks of a certain program identifier number, chunks associated with a certain bit rate, and the like).

A media stream is converted to chunks of variable size. This conversion is also referred to as chunking. Media and transport layer structures can be taken into account and even maintained. For example, the chunking can try to prevent the splitting of media frames (maintain frame boundaries), of transport stream headers, and the like. This media aware and transport layer aware chunking can be regarded as utilizing a video visibility layer that describes both structural and algorithmic elements of video transport and compression including transport metadata tables, clock reference information, GOP structure and size, frames structures and hierarchy, audio, video and interactive layers and layers of scalable video coding. This new layer applies to multiple video transport and A/V formats, including but not limited to MPEG-2 TS, MPEG-2 NV, H.264 both SD and HD.

The content of a chunk can be changed and, additionally or alternatively, multiple versions of the same media stream element can be generated. The latter is referred to as multi-dimensional chunking. The change of content can result in a new hash value for the chunk. Multiple versions are associated with multiple hash values and can be linked to each other in order to notify peers that these are different versions of the same media stream element. The mentioned below methods and systems can preserve the distribution consistency. The hashing consistency of P2P distribution can be maintained through techniques such as rehashing, chain-hashing reconstruction of DHTs, and the like.

Re-hashing entails constructing a new additional hash value and updating the metadata file When re-hashing is applied each chunk can have multiple hush values. Each value will be associated with some unique properties, like bit-rate or quality level. Media characteristic information is generated and distributed to a peer to peer manger and to peers. It may include association information that associates the multiple chunks (of the same media stream element) to each other. The association information enables the peers to understand that multiple chunks that have different hash values are associated with the same media stream element. The association information can include a media stream element identifier that by shared by all version of the same media stream element. The media characteristic information can indicate how these chunks differ from each other and, additionally or alternatively, can allow a peer to peer manager to decide the information sent to a peer, wherein the decision can be responsive to capacity information that can indicate capacity constraints associated with the provision of the chunk to the peer. A capacity constrain can be responsive to a bit rate of a communication line, buffer storage capacity and the like.

Chain-hashing creates a new hash which is based on the old hash in a way which enables it to be reconstructed at a different location. It can reduce the number of hash values (per chunks associated with the same media stream unit) stored at the peer to peer manager.

Conveniently, a peer can switch from receiving chunks of a certain bit rate to a chunk of another bit rate. Due to timing constraints imposed on the decoding of media streams and due to possible buffer size limitations of a peer a seamless transition from chunks of one bit rate to another can be conditioned by a simulation or other check or test that can guarantee (or at least indicate) that such switching can be seamless. Assuming that the allowable switching operations are known, the peer can receive peer data structures that enable a provision of these allowed streams. For example, if a peer starts to receive chunks of 1 Megabits/second (Mbps) and it can seamlessly switch to chunks of 2 Mbps but it can not seamlessly switch to chunks of 8 Mbps then it can receive peer data structure indicating where 1 Mbps and 2 Mbps chunks (of the same media stream) are located. Conveniently, the peer data structure does not indicate where 8 Mbps chunks of the same media stream are stored. Yet according to another embodiment of the invention the peer data structure can include information about all versions (including the 8 Mbps chunks) but the peer will query only the 1 Mbps and 2 Mbps.

Conveniently, two different video sources can be spliced in a distributed way. A significant work of the splicing can take place independently at each of the video sources. Accordingly, P2P packet of the primary source will be spliced at one intermediate server or client and another P2P packet carrying a commercial will be spliced at a different node or client.

Conveniently, the methods and system facilitate rate-shaping by entities such as intermediate nodes. A single P2P packet can be rate-shaped without affecting the overall streaming. Rate-shaping enables the delivery of video packets over congested links by reducing their bit-rate with only a minimal compromise on the video quality. In a P2P environment, rate-shaping will be enabled at the chunk level. The rate-shaping as well as other operations that can change a chunk (such as splicing) is followed by re-hashing in order to allow hash consistency preservation, as well as the peer capability of assembling chunks of different bit rates.

Conveniently, forward error correction (FEC) is facilitated by generating FEC information and optionally generating FEC chunk streams. The strength of the FEC and the size of FEC information per chunk can depend upon various parameters such as but not limited to capacity constraints, error rates, and the like. More limited bit-rate can result in allocating fewer resources to the FEC, and vice versa.

Conveniently, a media stream is converted to a video chunk stream, an audio chunk stream and a metadata chunk stream. The metadata chunk stream can include FEC chunks as well as control information (such as transport layer tables) that indicates which streams belong to the media stream. For example, the metadata can include a PMT table that indicates the program identifier (PID) of the video stream, audio stream and data stream of a single media stream.

Conveniently, a peer to peer manager can provide to a peer a peer data structure that includes peers that store only one type of chunk stream. For example, only video chunk stream, only audio chunk stream or only metadata chunk stream. Alternatively, a peer to peer manager can provide to peer a peer data structure that includes peers that store multiple types of chunks that are associated with the same media stream. For example—the peer data structure can include peers that store chunks of a video chunk stream as well as peers that store chunks of a audio chunk stream.

Conveniently, fast channel changes can be facilitated by flagging chunks that includes independently decodable frames (also referred to as random access frames) and sending to a peer that requested a channel change a chunk that includes the last independently decodable frame before the change channel request. Thus, instead of waiting till the next independently decodable frame—the fast channel change request can be followed by receiving a (possibly slightly delayed version) media stream that starts by an independently decodable frame. It is noted that the chunk that includes the last independently decodable frame before the change channel request can be transmitted over the peer to peer network with high (even highest) priority. According to an embodiment of the invention one a request to switch channel is received by the peer to peer manager it can send to the requesting peer a peer data structure as well as information that indicates where (in which chunks) the independently decodable frames are located.

Figure 1:
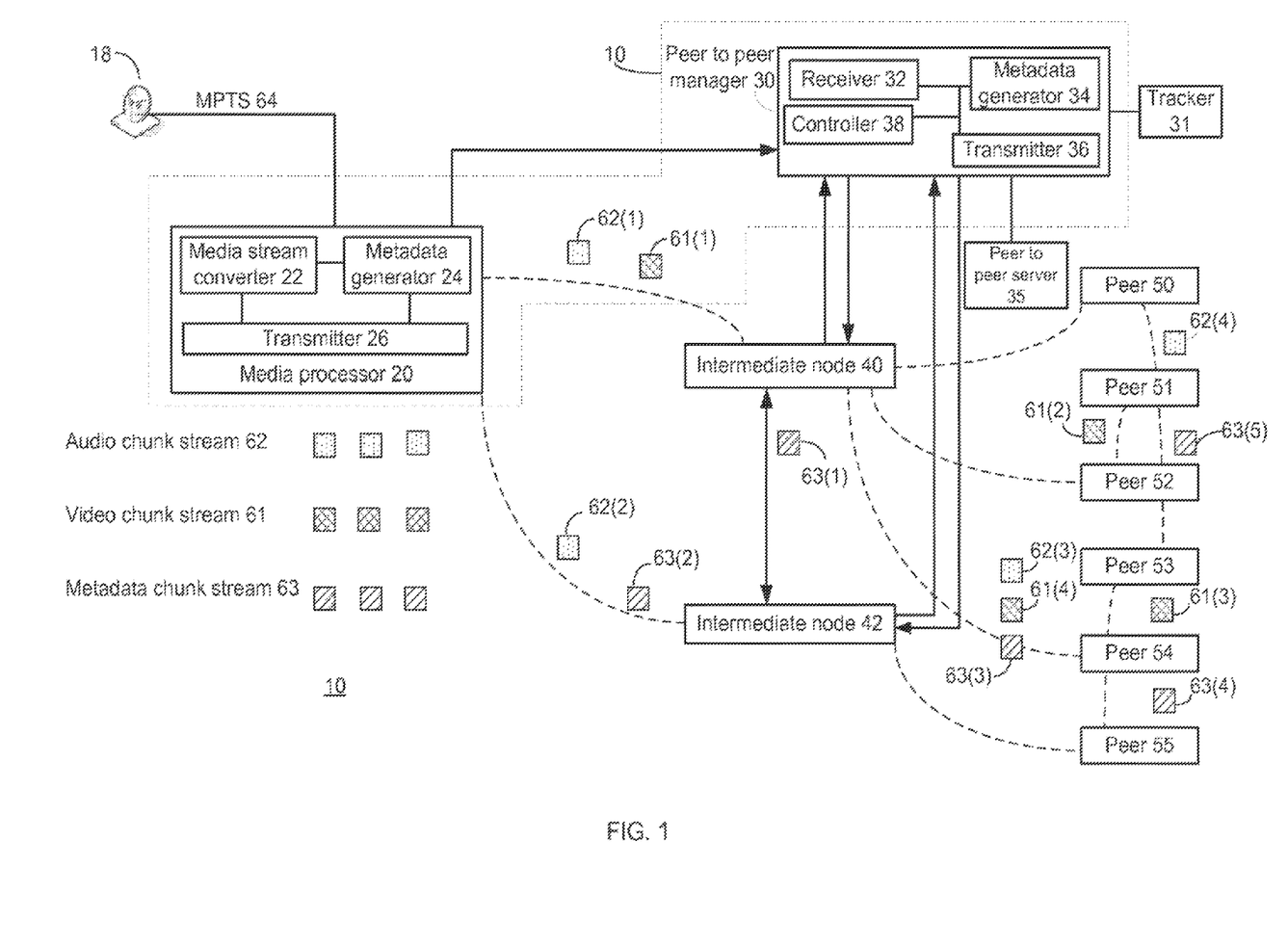
FIG. 1 schematically shows a system and its environment according to an embodiment of the invention.

FIG. 1A illustrates system 10 and its environment according to an embodiment of the invention.

System 10 includes media processor 20 and peer to peer manager 30. Peer to peer manager 30 can be connected to tracker 31 and to peer to peer server 35. Yet according to another embodiment of the invention peer to peer manager 30 is included within tracker 30. System 10 can receive media streams from one or more sources such as satellite dish 18. It can be connected to multiple peers such as peers 50, 51, 52, 53, 54 and 55, to intermediate nodes such as intermediate nodes 40 and 42 and to peer to peer server 35.

It is noted that peer data structure and capacity limitations can be stored at peer to peer server 35, at tracker 31, at peer to peer manager 30 or can be partially stored in each of these entities. Either one of peer to peer server 35, peer to peer manager 30, tracker 31, media processor 20 and intermediate nodes 40 and 42 can generate metadata, but this is not necessarily so. It is noted that FEC chunks are usually distributed among peers.

Peer to peer server 35 is accessed when a peer wishes to initiate a peer to peer session. It can be accessed by a website or by other means. It can store metadata such as the address of tracker 31. The metadata can be, for example, a .torrent file. Tracker 31, on the other hand, stores other metadata such as but not limited to a peer data structure that indicates where (in which peers) chunks are stored as well as media and/or transport layer characteristics of these chunks.

Media processor 20 acquires an MPEG-2 multiple program transport stream (MPTS) 64 from satellite dish 18, de-multiplexes it and creates separate chunk streams according the video and transport structure—it can generate video chunk stream 61, audio chunk stream 62 and metadata chunk stream 63. Chunk streams 61, 62 and 63 can be distributed to peers 50-55 and to intermediate nodes 40 and 42. FIG. 1 also illustrates some chunks such as video chunk 61(1) and audio chunk 62(1) that are sent from media processor 20 to intermediate node 40, video chunk 61(2) and audio chunk 61(2) that are sent from media processor 20 to intermediate node 42, metadata chunk 63(1) that is sent from intermediate node 42 to intermediate node 40, audio chunk 62(3), video chunk 61(4) and metadata chunk 64(3) that are sent from intermediate node 40 to peer 54, and various audio, video and metadata chunks (62(4), 61(2), 62(4), 61(3), 61(4), 63(4) and 63(5)) that are exchanged between peers.

Media processor 20 can generate chunk hash values as well as media characteristic information, transport layer characteristic information, association information and the like.

Media processor 20 includes: (i) media stream converter 22 that is configured to convert a media stream to chunks of variable size in response to media characteristics of the media stream; (ii) metadata generator 24 that is configured to generate a hash value for each chunk; and (iii) transmitter 26 that is configured to transmit to a peer to peer manager 30 metadata such as hash values and media characteristic information associated with the chunks.

Media characteristics can include frame boundaries, type of frame (independently decodable frame, dependently decodable frame), group of picture boundaries, bit rate, quality of service level, compression level, and the like. Media characteristic information can include flags indicative of an inclusion of an independently decodable frame within a chunk.

Transport layer characteristics can include PID values, PMT table, PIT table, and the like. The mentioned above information can be sent to tracker 31.

Peer to peer manager 30 or media processor 20 can monitor the status of peers, intermediate nodes and communication channels that are connected between them and can occasionally instructs intermediate nodes 40 and 42 to process chunks for the purpose of splicing, rate-shaping, FEC and other possible operations. Intermediate nodes 40 and/or 42 process the video and can exchange metadata with each other. As a result of content processing at intermediate nodes 40 and 42, chunks are rehashed and metadata is updated at peer to peer server 35.

Media processor 20 can receive media streams from different sources including broadcast channels and the Internet, as either live streams or files. Content can be in various transport formats such as MPEG-2 or UDP and in different A/V codes including MPEG-2 and H.264. The diagram describes MPEG-2 A/V coming over MPEG-2 TS through some broadcast acquisition system.

Media processor 20 can perform media aware and transport layer aware chunking. The outcome can be chunks of variable size. Media processor 20 can perform the chunking in response to characteristics such as media frame boundaries, transport layer structures, program identifier values, group of picture boundaries, clock reference information, transport layer tables, scalable video coding metadata. For example, a video frame should be included in a single video chunk. A group of pictures (GOP) can be maintained in a single chunk if the chunk can include the entire GOP. Even if a GOP is split between chunks the borders of the chunks can be aligned with the borders of the GOP. Thus the last video chunk that conveys a GOP can end at the end of the GOP.

Different chunks can be generated for different type of information—thus video chunks can include only video information, audio chunks can include only audio information and metadata chunks can include only metadata such as a PAT table, a PMT table and FEC information.

Conveniently, in case of Scalable Video Coding (SVC), separate SVC layers can be separated into different chunk streams. SVC can include media stream layers of different quality level as well as differential SVC layers.

Conveniently, media processor 20 assigns the same identifier to all chunks that belong to the same chunk stream. The identifier can be included in a chunk header or trailer but this is not necessarily so.

The chunk streams can be sent to peers upon request or upon a chunk stream distribution scheme that spreads the chunk streams among peers so that when a request to obtain the media stream is received the peer can obtain associated chunks from multiple sources. The same applies to intermediate nodes—they can receive chunks upon request or in response to a chunk stream distribution scheme.

When a peer requests from peer to peer manager 30 to obtain a media stream, peer to peer manager 30 can send to the peer metadata as well as information indicative of the metadata chunk stream and especially where chunks that include the PMT and PIT tables is stored. After obtaining these tables, the peer can request to obtain the media and video chunk streams. Yet according to another embodiment of the invention the peer first receives from peer to peer server 35 (or from peer to peer manager 30) information indicative of all the chunk stream and their media and/or transport layer characteristics but not their locations and then ask from peer to peer manager 30 (or from peer to peer server 35) information relating to the location (peers that stored these chunks) of relevant chunk streams only.

Peers are usually (but not necessarily) deployed at client end-points. Peers can connect and disconnect from a distribution swarm that includes all the peers which are currently serving a media stream or only one type of chunk stream. Thus, a single swarm can provide the entire chunk streams (video, audio and metadata chunk streams) or can provide only one type of chunk stream—thus multiple swarms can participate in distributing a single media stream.

Peer to peer manager 30 can perform various kinds of real-time decisions based on network status and other peers' status. The network status and peer status are represented by capacity information. Capacity information is indicative of capacity constraints associated with the provision of chunks to peers. For example, capacity information can indicate the current available bit rate for conveying chunks to peer 50, to intermediate node 40 and the like.

Peer to peer manager 30 can decide, in view of the capacity information that one or more peers should receive a video chunk stream only after the video chunk stream (or some chunks of the stream) should be compressed. It (or media processor 20) can instruct intermediate node 40 to obtain the one or more chunks to be compressed (using P2P methods) and how to compress it. The latter can indicate the required size reduction, the required bit rate of the compressed chunk, and the like. It is noted that tracker 31 can instruct such a compression in response to real time conditions but can also instruct such a compression in advance, so that compressed chunks will be available when needed. The compressed chunks can replace the non-compressed chunks or can co-exist with the non-compressed chunks. The intermediate node can execute the following stages: (i) receiving an instruction to compress a chunk and information related to the compression such a requested compression ratio, a required quality and the like; (ii) receive a chunk to be compressed or a chunk stream that includes a chunk to be compressed; (iii) compressing (rate-shaping) the chunk to provide a compressed chunk of a desired quality or size, (iv) generating a new hash value for the compressed chunk, (v) update the metadata file wherein the updated chunk metadata can include a new hash value and media characteristic information and sending, and (vi) distribute the compressed chunk to one or more peers per request or according to a chunk distribution scheme.

Peer to peer manager 30 includes: (i) receiver 32 that is configured to receive: (a) metadata such as hash values and media characteristic information associated with chunks that represent a media stream, (b) capacity information indicative of capacity constraints associated with a provision of chunks to peers; and (c) a request to obtain a peer data structure indicative of peers that are capable of providing chunks associated with a media stream; (ii) metadata generator 34 that is configured to generate the peer data structure in response to an identity of the media stream, the media characteristic information and capacity information; (iii) transmitter 36 that is configured to transmit to the peer the peer data structure; and (iv) controller 38 that controls the transfer of chunk streams, determines whether to compress media streams, determines which media chunk streams can be received by which peers and especially which version switching operations can be performed by which peer, and the like.

A compression of a chunk is followed by generating (by the intermediate node) of a hash value of the chunk. This so-called new hash value can be sent to peer to peer manager 30 and it can generate (or receive from the compressing intermediate node) media characteristic information that represents the new media characteristics (such as size, bit rate, quality of service) of the chunk. Alternatively, peer to peer manager 30 can receive a new hash value that will represent the previous content of the chunk (before compressing) and the content of the compressed chunk. Thus, the intermediate nodes can also generate the new hash values.

Thus, metadata file can include information on different versions (compressed, non-compressed, and the like) of a chunk and that information can be of various formats. Peer to peer manager 30 or the intermediate node can also generate association information that associated between different versions (different chunks) that represent the same media stream element (for example, the same video frame).

Peer to peer manager 30 can store a multi-dimensional table that includes association information that will tie all versions of the media stream element to each other. Peer to peer manager 30 can also store media characteristic information and additionally or alternatively transport layer characteristic information.

Peer to peer manager 30, intermediate nodes 40 and 42 and peers 50-55 communicate with tracker 31 so that tracker 31 is aware of the locations of chunks and can provide to requesting peers which peers can provide requested chunk streams.

Yet according to another embodiment of the invention a distributed splicing method is provided. Two intermediate nodes or clients can engage in a distributed splicing operation. Media processor 20 can identify a splicing opportunity (for example, in response to a reception of a cue tone) and will select the splicing entities out of intermediate nodes 40, 42 and even out of peers 50-55. Media processor 20 will then communicate with the selected splicing entities and communicate which chunks will be affected by the splicing. Typically two chunk streams are involved in the splicing—one can be referred to as a primary chunk stream and the other is referred to as a secondary chunk stream.

The selected splicing entities will process the chunk streams and exchange metadata (related to the splicing) with each other. Once the content is processed, a new hash is generated as described before. Clients can obtain chunks from primary and secondary chunks streams according to some application-layer logic.

Figure 4:
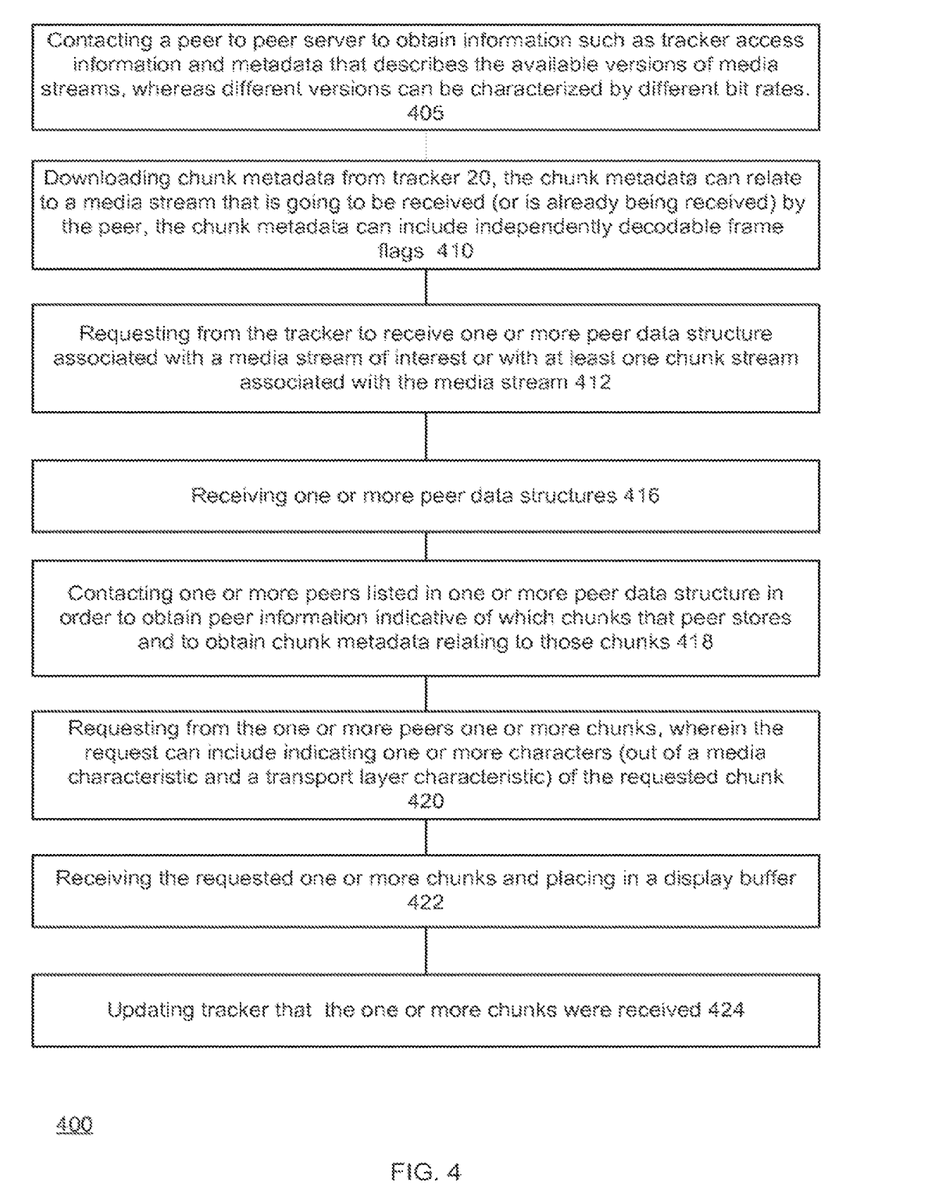
FIG. 4 schematically shows a method according to an embodiment of the invention.

A peer such as peer 50 can execute various stages, as illustrated in FIG. 4: (i) stage 405 of contacting a peer to peer server to obtain information such as tracker access information and metadata that describes the available versions of media streams, whereas different versions can be characterized by different bit rates; (ii) stage 410 of downloading metadata from the tracker such as but not limited to chunk metadata that can relate to a media stream that is going to be received (or is already being received) by the peer, the chunk metadata can include independently decodable frame flags (iii) stage 412 of requesting from the tracker, peer to peer server or peer to peer manager, to receive one or more peer data structure associated with a media stream of interest or with at least one chunk stream associated with the media stream, (iv) stage 416 of receiving one or more peer data structures, (v) stage 418 of contacting one or more peers listed in one or more peer data structure in order to obtain peer information indicative of which chunks that peer stores and to obtain chunk metadata relating to those chunks, (vi) stage 420 of requesting from the one or more peers one or more chunks, wherein the request can include indicating one or more characters (out of a media characteristic and a transport layer characteristic) of the requested chunk, (vi) stage 422 of receiving the requested one or more chunks and placing in a display buffer, and (vii) stage 424 of updating tracker that the one or more chunks were received.

Stage 410 can be repeated each time period (for example, each one or few seconds) or in response to an event. Stage 412 can be repeated when the peer data structure includes few peers or when a quality of the media stream falls below a quality threshold.

A peer such as peer 50 can also provide chunks and chunk metadata.

Figure 2A:
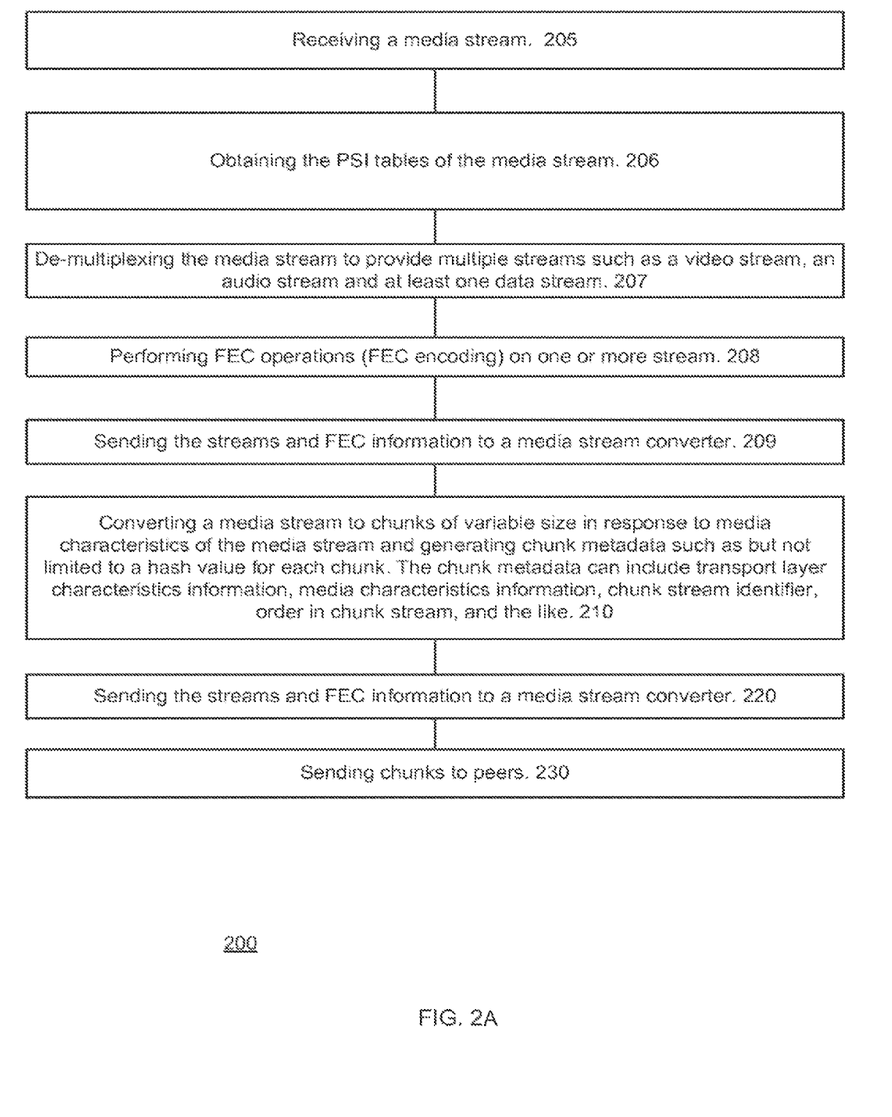
FIG. 2A and FIG. 2B schematically shows a method according to an embodiment of the invention.
Figure 2B:
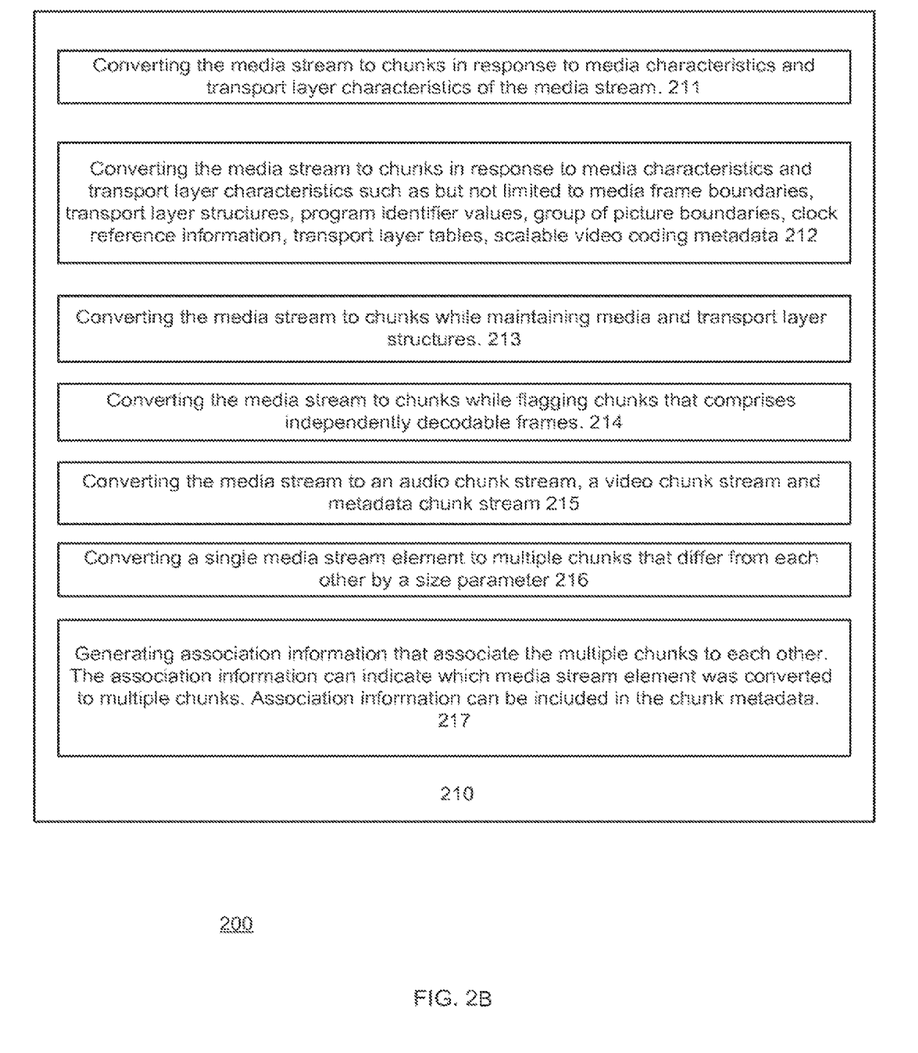

FIG. 2 illustrates method 200 for generating chunks for peer to peer distribution, according to an embodiment of the invention.

Method 200 starts by stage 205 of receiving a media stream. The media stream can be a live program, but this is not necessarily so. For example, the media stream can be provided from a video on demand server.

Stage 205 is followed by stage 206 of obtaining the PSI tables of the media stream. These tables include the PMT and PAT table. These tables include the program identifier (PID) per stream—audio stream, video stream and data (also referred to as metadata) stream.

Stage 206 is followed by stage 207 of de-multiplexing the media stream to provide multiple streams such as a video stream, an audio stream and at least one data stream.

Stage 207 can be followed by stage 208 of performing FEC operations (FEC encoding) on one or more stream.

Stage 208 is followed by stage 209 of sending the streams and FEC information to a media stream converter.

Stage 209 is followed by stage 210 of converting a media stream to chunks of variable size in response to media characteristics of the media stream and generating chunk metadata such as but not limited to a hash value for each chunk. The chunk metadata can include transport layer characteristics information, media characteristics information, chunk stream identifier, order in chunk stream, and the like. Each chunk stream can be identified by a unique identifier and each chunk can be assigned with a serial number indicative of the order of the chunk in the chunk stream. The chunk metadata can include the chunk identifier and serial number.

Stage 210 can include at least one of stages 211, 212, 213 and 214 or a combination thereof.

Stage 211 includes converting the media stream to chunks in response to media characteristics and transport layer characteristics of the media stream.

Stage 212 includes converting the media stream to chunks in response to media characteristics and transport layer characteristics such as but not limited to media frame boundaries, transport layer structures, program identifier values, group of picture boundaries, clock reference information, transport layer tables, scalable video coding metadata.

Stage 213 includes converting the media stream to chunks while maintaining media and transport layer structures.

Stage 214 includes converting the media stream to chunks while flagging chunks that comprises independently decodable frames.

Stage 210 is followed by stage 220 of creating metadata file of hash values and media characteristic information associated with the chunks. The metadata file can be sent to a peer to peer manager, to a tracker and to a peer to peer server.

Stage 220 can be followed by stage 230 of sending chunks to peers. The sending can be responsive to requests from the peers to obtain the chunks but this is not necessarily so. Stage 230 can be triggered by a chunk distribution scheme that does not depend upon requests to obtain chunks. Stage 230 can include sending chunks to intermediate nodes.

Stage 215 includes converting the media stream to an audio chunk stream, a video chunk stream and metadata chunk stream.

Stage 216 includes converting a single media stream element to multiple chunks that differ from each other by a size parameter.

Stage 216 can be followed by stage 217 of generating association information that associate the multiple chunks to each other. The association information can indicate which media stream element was converted to multiple chunks. Association information can be included in the chunk metadata. Chunk metadata can be sent to peers, intermediate nodes and to a peer to peer manager.

Method 200 can also include stage 240 of determining a capability of a peer to seamlessly switch from a first bit rate chunk to a second bit rate chunk; wherein the first bit rate differs from the second bit rate. This determination can assist a peer to peer manager in determining which chunk metadata to send to each peer.

Figure 3:
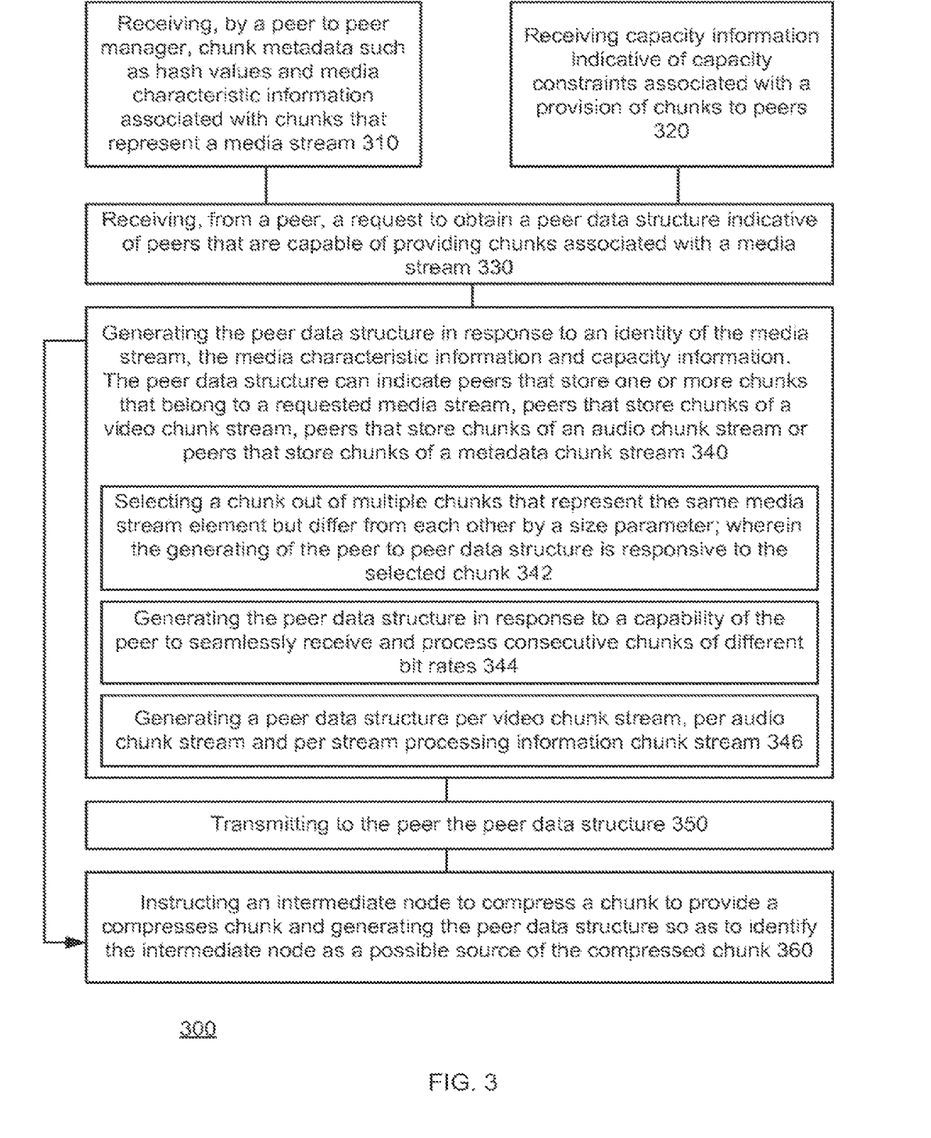
FIG. 3 schematically shows a method according to an embodiment of the invention.

FIG. 3 illustrates method 300 for generating chunks for managing peer to peer distribution of chunks, according to an embodiment of the invention.

Method 300 starts by stages 310 and 320.

Stage 310 includes receiving, by a peer to peer manager, chunk metadata file containing data such as hash values and media characteristic information associated with chunks that represent a media stream. Referring to the example set fourth in FIG. 1, tracker 31 can receive from media processor 20 chunk metadata.

Stage 320 includes receiving capacity information indicative of capacity constraints associated with a provision of chunks to peers. The capacity information can be obtained in various manners. For example, it can be obtained during an initialization stage during which a user feeds capacity information. Yet for another example, the capacity information can be learnt on the fly and can be updated in response to communication failures, buffer overflows or other errors or events. Referring to the example set fourth in FIG. 1, tracker 31 can obtain this information by asking peers 50-55 about their capacity and can also obtain error reports and/or communication reports indicative of the status of communication channels and buffers. Also can get input from a network management system or bandwidth management Stage 310 and 320 can be repeated multiple times.

Stages 310 and 320 are followed by stage 330 of receiving, from a peer, a request to obtain a peer data structure indicative of peers that are capable of providing chunks associated with a media stream. The request can initiate a transfer of chunks to that peer. The peer data structure can be a peer list.

Stage 330 is followed by stage 340 of generating the peer data structure in response to an identity of the media stream, the media characteristic information and capacity information. The peer data structure can indicate peers that store one or more chunks that belong to a requested media stream, peers that store chunks of a video chunk stream, peers that store chunks of an audio chunk stream or peers that store chunks of a metadata chunk stream.

Stage 340 can include sending chunk metadata to the peer, if such chunk metadata is not included in the peer data structure. It is noted that the peer data structure can relate to an entire media stream or an entire chunk stream while chunk metadata can be more detailed and refer to each chunk or group of chunks.

Stage 340 is followed by stage 350 of transmitting to the peer the peer data structure.

Stage 340 can be followed by stage 360. Stage 360 can also be executed regardless of stage 340—in order to provide (in advance) compressed chunks.

Stage 360 includes instructing an intermediate node to compress a chunk to provide a compresses chunk and generating the peer data structure so as to identify the intermediate node as a possible source of the compressed chunk.

Stage 340 can include stage 342 of selecting a chunk out of multiple chunks that represent the same media stream element but differ from each other by a size parameter; wherein the generating of the peer to peer data structure is responsive to the selected chunk. The selection can be responsive to capacity constraints and, additionally or alternatively to quality constraints. It can be desired to transfer the highest quality stream that the communication channels and buffers allow.

Stage 340 can include stage 344 of generating the peer data structure in response to a capability of the peer to seamlessly receive and process consecutive chunks of different bit rates. Thus, if the peer can seamlessly switch from a 4 Mbps stream to a 8 Mbps frame than the peer data structure can include peers that store 4 Mbps chunks and 8 Mbps chunks.

Stage 340 can include stage 346 of generating a peer data structure per video chunk stream, per audio chunk stream and per stream processing information chunk stream.

Figure 5:
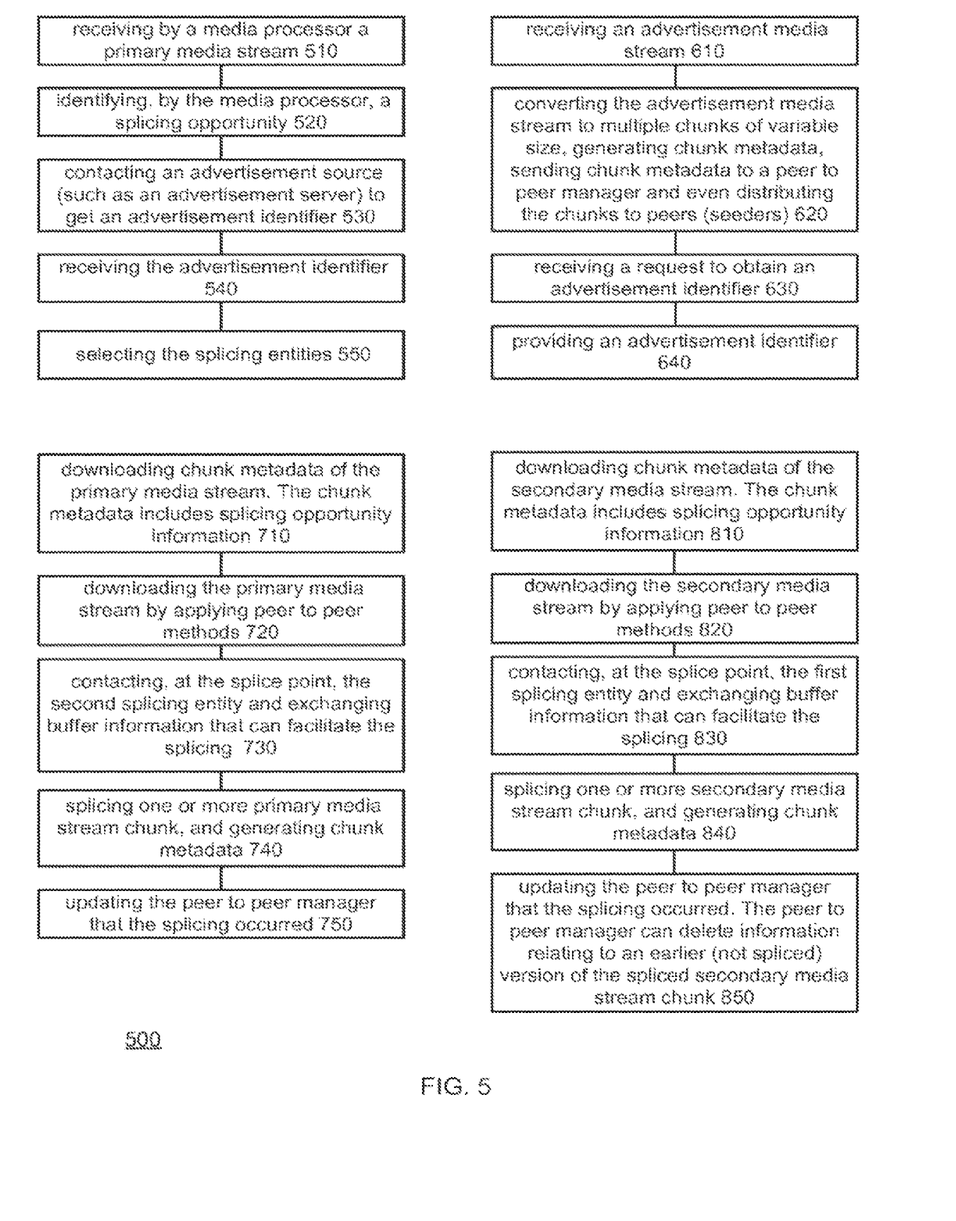
FIG. 5 schematically shows a method according to an embodiment of the invention.

FIG. 5 illustrates method 500 for distributed splicing according to an embodiment of the invention.

Method 500 starts by two sequences of stages. A first sequence of stages is executed by a media processor. It includes stages 510, 520, 530, 540 and 550.

Stage 510 includes receiving by a media processor a primary media stream. Stage 510 is followed by stage 520 of identifying, by the media processor, a splicing opportunity. This can include identifying a cue tone. Assuming that the splicing is generated in order to insert an advertisement then stage 520 is followed by stage 530 of contacting an advertisement source (such as an advertisement server) to get an advertisement identifier. Stage 530 is followed by stage 540 of receiving the advertisement identifier. Stage 540 is followed by stage 550 of selecting the splicing entities. The splicing entities participate in a distributed splicing process. They can be intermediate nodes or even peers.

A second sequence of stages is executed by an advertisement server. It includes stages 610, 620, 630 and 640. Stage 610 includes receiving an advertisement media stream. Stage 610 is followed by stage 620 of converting the advertisement media stream to multiple chunks of variable size, generating chunk metadata, sending chunk metadata to a peer to peer manager and even distributing the chunks to peers (seeders). The chunk metadata can include one or more chuck stream identifiers that can be regarded as advertisement identifiers. Stage 620 can include method 200 or stages thereof. Stage 620 is followed by stage 630 of receiving a request to obtain an advertisement identifier. Stage 630 is followed by stage 640 of providing an advertisement identifier.

The first and second stage sequences are followed by a third stage sequence and a fourth stage sequence that are executed by the splicing entities.

A first splicing entity executes the third stage sequence that includes stages 710, 720, 730, 740 and 750.

Stage 710 includes downloading chunk metadata of the primary media stream. The chunk metadata includes splicing opportunity information.

Stage 710 is followed by stage 720 of downloading the primary media stream by applying peer to peer methods. This can include contacting a torrent and downloading chunks of the primary media stream from seeders.

Stage 720 is followed by stage 730 of contacting, at the splice point, the second splicing entity and exchanging buffer information that can facilitate the splicing.

Stage 730 is followed by stage 740 of splicing one or more primary media stream chunk, and generating chunk metadata.

Stage 740 is followed by stage 750 of updating the peer to peer manager that the splicing occurred. The peer to peer manager can delete information relating to an earlier (not spliced) version of the spliced primary media stream chunk.

A second splicing entity executes the fourth stage sequence that includes stages 810, 820, 830, 840 and 850.

Stage 810 includes downloading chunk metadata of the secondary media stream. The chunk metadata includes splicing opportunity information.

Stage 810 is followed by stage 820 of downloading the secondary media stream by applying peer to peer methods. This can include contacting a torrent and downloading chunks of the secondary media stream from seeders.

Stage 820 is followed by stage 830 of contacting, at the splice point, the first splicing entity and exchanging buffer information that can facilitate the splicing.

Stage 830 is followed by stage 840 of splicing one or more secondary media stream chunk, and generating chunk metadata.

Stage 840 is followed by stage 850 of updating the peer to peer manager that the splicing occurred. The peer to peer manager can delete information relating to an earlier (not spliced) version of the spliced secondary media stream chunk.

Each of the mentioned above methods or a combination thereof can be executed by one or more computers. Each computer can execute code that is stored in a tangible computer readable medium that can be included in a computer program product.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In addition, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations, and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps from those listed in a claim. Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

I claim:

1. A method for generating chunks for peer to peer distribution, the method comprises:
    converting a media stream to chunks of variable size in response to media characteristics of the media stream; wherein sizes of the chunks are responsive to the media characteristics of the media stream and to transport later characteristics of the media stream;
    generating a hash value for each chunk;
    transmitting to a peer to peer manager hash values and media characteristic information associated with the chunks and
    receiving a request from a peer to obtain chunks of the media stream and providing the chunks to the peer.

2. The method according to claim 1 comprising generating a new hash value for a chunk based upon an old hash value of the chunk.

3. The method according to claim 1 comprising converting the media stream to chunks in response to scalable video coding metadata.

4. The method according to claim 1 comprising converting the media stream to chunks while preventing splitting of media and transport layer structures.

5. The method according to claim 1 comprising converting the media stream to chunks while flagging each chunk that comprises independently decodable frames.

6. The method according to claim 1 wherein the metadata chunk stream comprises forward error correction information and transport layer tables.

7. The method according to claim 1 comprising converting the media stream to an audio chunk stream, a video chunk stream and metadata chunk stream.

8. The method according to claim 1 comprising converting multiple versions of single media stream element to multiple chunks that differ from each other by a size parameter.

9. The method according to claim 8 comprising generating association information that associate the multiple chunks to each other.

10. The method according to claim 1 comprising determining a capability of a peer to seamlessly switch from a first bit rate chunk to a second bit rate chunk; wherein the first bit rate differs from the second bit rate.

11. A method for managing peer to peer distribution of chunks, the method comprises:
    receiving, by a peer to peer manager, hash values and media characteristic information associated with chunks that represent a media stream; wherein sizes of the chunks are responsive to the media characteristics of the media stream and to transport layer characteristics of the media stream;
    receiving capacity information indicative of capacity constraints associated with a provision of chunks to peers;
    receiving, from a peer, a request to obtain a peer data structure indicative of peers that are capable of providing chunks associated with a media stream;
    generating the peer data structure in response to an identity of the media stream, the media characteristic information and capacity information; and
    transmitting to the peer the peer data structure.

12. The method according to claim 11 comprising:
    determining, in response to capacity information indicative of a capacity constraints associated with the provision of chunks to peers, to compress a chunk;
    instructing an intermediate node to compress the chunk to provide a compresses chunk; and
    generating the peer data structure so as to identify the intermediate node as a possible source of the compressed chunk.

13. The method according to claim 11 comprising selecting a chunk out of multiple chunks that represent different versions of the same media stream element and differ from each other by a size parameter; wherein the generating of the peer to peer data structure is responsive to the selected chunk.

14. The method according to claim 11 comprising generating the peer data structure in response to a capability of the peer to seamlessly receive and process consecutive chunks of different bit rates.

15. The method according to claim 11 comprising generating a peer data structure per video chunk stream, per audio chunk stream and per stream processing information chunk stream.

16. A media processor that comprises:
    a media stream converter configured to convert a media stream to chunks of variable size in response to media characteristics of the media stream and in response to transport layer characteristics of the media stream; wherein sizes of the chunks are responsive to the media characteristics of the media stream;
    a metadata generator, configured to generate a hash value for each chunk; and a transmitter for transmitting to a peer to peer manager hash values and media characteristic information associated with the chunks;

wherein the media stream processor is further configured to receive a request from a peer to obtain chunks of the media stream and providing the chunks to the peer.

17. The media processor according to claim 16 configured to generate a new hash value for a chunk based upon an old hash value of the chunk.

18. The media processor according to claim 16 configured to convert the media stream to chunks in response to scalable video coding metadata.

19. The media processor according to claim 16 configured to convert the media stream to chunks withput splitting media and transport layer structures.

20. The media processor according to claim 16 configured to convert the media stream to chunks while flagging each chunk that comprises independently decodable frames.

21. The media processor according to claim 17 wherein the metadata chunk stream comprises forward error correction information and transport layer tables.

22. The media processor according to claim 16 configured to convert the media stream to an audio chunk stream, a video chunk stream and metadata chunk stream.

23. The media processor according to claim 16 configured to convert multiple versions of a single media stream element to multiple chunks that differ from each other by a size parameter.

24. The media processor according to claim 23 configured to generate association information that associate the multiple chunks generated from the single media stream element to each other.

25. The media processor according to claim 16 configured to determine a capability of a peer to seamlessly switch from a first bit rate chunk to a second bit rate chunk; wherein the first bit rate differs from the second bit rate.

26. A peer to peer manager that comprises:
a receiver that is configured to receive:
hash values and media characteristic information associated with chunks that represent a media stream, wherein sizes of the chunks are responsive to the media characteristics of the media stream and to transport layer characteristics of the media stream;
capacity information indicative of capacity constraints associated with a provision of chunks to peers;
a request to obtain a peer data structure indicative of peers that are capable of providing chunks associated with a media stream;
a metadata generator configured to generate the peer data structure in response to an identity of the media stream, the media characteristic information and capacity information; and
a transmitter, configured to transmit to the peer the peer data structure.

27. The peer to peer manager according to claim 26 comprising a controller that is configured to determine, in response to capacity information indicative of a capacity constraints associated with the provision of chunks to peers, to compress a chunk; and instruct an intermediate node to compress a chunk to provide a compresses chunk; and wherein the metadata generator is configured to generate the peer data structure so as to identify the intermediate node as a possible source of the compressed chunk.

28. The peer to peer manager according to claim 26 wherein the controller is configured to select a chunk out of multiple chunks that represent different versions of the same media stream element but differ from each other by a size parameter; wherein the metadata generator is configured to generate a peer to peer data structure that is responsive to the selected chunk.

29. The peer to peer manager according to claim 26 configured to generate the peer data structure in response to a capability of the peer to seamlessly receive and process consecutive chunks of different bit rates.

30. The peer to peer manager according to claim 26 wherein the metadata generator is configured to generate a peer data structure per video chunk stream, per audio chunk stream and per stream processing information chunk stream.

31. A computer program product that comprises a non-transitory computer readable medium that stores instructions for:
converting a media stream to chunks of variable size in response to media characteristics of the media stream; wherein sizes of the chunks are responsive to the media characteristics of the media stream and to transport later charactaristics of the media stream;
generating a hash value for each chunk;
transmitting to a peer to peer manager hash values and media characteristic information associated with the chunks and
receiving a request from a peer to obtain chunks of the media stream and providing the chunks to the peer.

32. A computer program product that comprises a non-transitory computer readable medium that stores instructions for:
receiving hash values and media characteristic information associated with chunks that represent a media stream; wherein sizes of the chunks are responsive to the media characteristics of the media stream and to transport layer characteristics of the media stream;
receiving capacity information indicative of capacity constraints associated with a provision of chunks to peers;
receiving, from a peer, a request to obtain a peer data structure indicative of peers that are capable of providing chunks associated with a media stream;
generating the peer data structure in response to an identity of the media stream, the media characteristic information and capacity information; and
transmitting to the peer the peer data structure.

33. The method according to claim 1 comprising converting the media stream to chunks in response to program identifier values.

34. The method according to claim 1 comprising converting the media stream to chunks in response to clock reference information.

* * * * *